(12) United States Patent
Tanaka et al.

(10) Patent No.: US 12,164,871 B2
(45) Date of Patent: Dec. 10, 2024

(54) MULTILINGUAL SUMMARIZATION OF EPISODES USING LONGFORMERS

(71) Applicant: Spotify AB, Stockholm (SE)

(72) Inventors: Edgar Tanaka, Croydon (GB); Ann Clifton, Lopez Island, WA (US)

(73) Assignee: Spotify AB, Stockholm (SE)

( * ) Notice: Subject to any disclaimer, the term of this patent is extended or adjusted under 35 U.S.C. 154(b) by 338 days.

(21) Appl. No.: 17/735,384

(22) Filed: May 3, 2022

(65) Prior Publication Data
US 2023/0359837 A1 Nov. 9, 2023

(51) Int. Cl.
| | |
|---|---|
| G06F 40/258 | (2020.01) |
| G06F 40/151 | (2020.01) |
| G06F 40/166 | (2020.01) |
| G06F 40/197 | (2020.01) |
| G06F 40/263 | (2020.01) |
| G06F 40/284 | (2020.01) |
| G06F 40/56 | (2020.01) |
| G06F 40/58 | (2020.01) |
| G06N 20/10 | (2019.01) |

(52) U.S. Cl.
CPC .......... *G06F 40/258* (2020.01); *G06F 40/151* (2020.01); *G06F 40/166* (2020.01); *G06F 40/197* (2020.01); *G06F 40/263* (2020.01); *G06F 40/284* (2020.01); *G06F 40/56* (2020.01); *G06F 40/58* (2020.01); *G06N 20/10* (2019.01)

(58) Field of Classification Search
None
See application file for complete search history.

(56) References Cited

U.S. PATENT DOCUMENTS

| | | | |
|---|---|---|---|
| 2015/0339288 A1 | 11/2015 | Baker et al. | |
| 2018/0300400 A1 | 10/2018 | Paulus | |
| 2019/0266228 A1 | 8/2019 | Sharma et al. | |
| 2021/0056170 A1* | 2/2021 | Bohannon | G06F 16/3329 |

(Continued)

OTHER PUBLICATIONS

Beltagy, Iz et al., "Longformer: The Long-Document Transformer", arXiv:2004.05150v2 [cs.CL], Dec. 2, 2020, 17 pgs.

(Continued)

*Primary Examiner* — Antim G Shah
(74) *Attorney, Agent, or Firm* — McDonnell Boehnen Hulbert & Berghoff LLP

(57) ABSTRACT

A full attention mechanism of a multilingual transformer model is converted into a Longformer attention mechanism to generate a Longformer multilingual transformer model. The Longformer multilingual transformer model is finetuned to perform a summarization task based on episode-description:episode-transcript pairs, thereby generating a finetuned Longformer multilingual transformer model. The Longformer multilingual transformer model also can further be finetuned to perform a summarization task based on article-summary:full-original-article pairs. A summary of a query episode transcript can be generated using the single-finetuned Longformer multilingual transformer model and/ or the double-finetuned Longformer multilingual transformer model. The multilingual transformer-based model enables systems, methods and computer products to be capable of generating multilingual abstractive summaries.

28 Claims, 7 Drawing Sheets

(56) References Cited

U.S. PATENT DOCUMENTS

2022/0172726 A1* 6/2022 Garg .................... G06F 40/216
2022/0318255 A1* 10/2022 Fei ................... G06F 16/24578

OTHER PUBLICATIONS

Biswas, Pratik et al., "Extractive Summarization of Call Transcripts", Mar. 19, 2021, 10 pgs.

Clifton, Ann et al., "100,000 Podcasts: A Spoken English Document Corpus", Proceedings of the 28th International Conference on Computational Linguistics, Barcelona, Spain (Online), Dec. 8-13, 2020, pp. 5903-5917.

Devlin, Jacob et al., "BERT: Pre-training of Deep Bidirectional Transformers for Language Understanding", May 24, 2019, arXiv:1810.04805v2 [cs.CL], 16 pages.

French, Robert M., "Catastrophic Forgetting in Connectionist Networks:Causes, Consequences and Solutions", 1999, Trends in Cognitive Sciences,3(4), 18 pgs.

Hasan, Tahmid et al., "XL-Sum: Large-Scale Multilingual Abstractive Summarization for 44 Languages", Findings of the Association for Computational Linguistics: ACL-IJCNLP 2021, Aug. 1-6, 2021, pp. 4693-4703.

Karlbom, Hannes et al., "Abstractive Podcast Summarization using BART with Longformer Attention", Published in TREC 2020, 5 pages.

Kryscinski, Wojciech et al., "Neural Text Summarization: A Critical Evaluation", arXiv:1908.08960v1 [cs.CL], Aug. 23, 2019, 13 pages.

Lewis, Mike et al., "BART: Denoising Sequence-to-Sequence Pre-training for Natural Language Generation, Translation, and Comprehension", Conference: Proceedings of the 58th Annual Meeting of the Association for Computational Linguistics, 2020, p. 7871-7880.

Lin, Chin-Yew, "ROUGE: A Package for Automatic Evaluation of Summaries", Barcelona, Spain, Association for Computational Linguistics, Jul. 2004, pp. 74-81.

Liu, Yinhan et al., "Multilingual Denoising Pre-training for Neural Machine Translation", arXiv:2001.08210v2 [cs.CL], Jan. 23, 2020, 17 pgs.

Mihalcea, Rada et al., "TextRank: Bringing Order into Texts", 2004, 8 pgs.

Reddy, Sravana et al., "Detecting Extraneous Content in Podcasts", Proceedings of the 16th Conference of the European Chapter of the Association for Computational Linguistics, Apr. 19-23, 2021, pp. 1166-1173.

Tang, Yuqing et al., "Multilingual Translation with Extensible Multilingual Pretraining and Finetuning", Aug. 2, 2020, ArXiv abs/2008.00401 (2020): 15 pgs.

Xue, Linting et al., "mT5: A Massively Multilingual Pre-trained Text-to-Text Transformer", Proceedings of the 2021 Conference of the North American Chapter of the Association for Computational Linguistics: Human Language Technologies, Jun. 6-11, 2021, pp. 483-498.

Zhang, Biao et al., "Improving Massively Multilingual Neural Machine Translation and Zero-Shot Translation", Apr. 24, 2020, arXiv:2004.11867v1 [cs.CL], ACL2020, 13 pgs.

Beltagy, Iz et al., "Roberta to longformer: build a "long" version of pretrained models", https://github.com/allenai/longformer/blob/master/scripts/convert_model_to_long.ipynb, accessed Jul. 18, 2021.

Bahdanau, Dzmitry, et al., "Neural Machine Translation by Jointly Learning to Alighn and Translate", ICLR Conference paper, ICLR May 19, 2015, 15 pages.

Johnson, Melvin, et al., "Google's Multilingual Neural Machine Translation System: Enabling Zero-Shot Translation", Transactions of the Association for Computational Linguistics, vol. 5, pp. 339-351, 2017.

Askari, Arian, et al. "Combining lexical and neural retrieval with longformer-based summarization for effective case law retrieval", DESIRES 2021 2nd Int'l. Conf. on Design of Experimental search Information REtrieval Systems, Sep. 15-18, 2021, 9 pgs.

Karlbom, Hannes, "Abstractive Summarizations of Podcast Transcriptions", Uppsala Universitet, Apr. 2021, 87 pages.

U.S. Appl. No. 17/700,290 entitled "Systems and Methods for Detecting Non-Narrative Regions of Texts", filed Mar. 21, 2022, 43 pages.

* cited by examiner

_700_

_702_
**Multilingual Transformer Model
pretrained in multiple languages (e.g., mBart-50)**

Languages in which Pretrained
(e.g., 50 languages: EN, ES, PT, JP, ..., etc.)

_704_ finetuned to summarization task in
(L) target languages
e.g., (EN, ES, PT)

- English → finetuned Longformer Multilingual Transformer Model (122)
- Japanese → Multilingual Transformer Model (e.g., mBart-50)(123)
- Klingon → Model not available. Tokenize and Crop.

FIG. 7

MULTILINGUAL SUMMARIZATION OF EPISODES USING LONGFORMERS

TECHNICAL FIELD

Example aspects described herein relate generally to text summarization, and more particularly to using machine learning models to produce multilingual abstractive summaries from episode transcripts.

BACKGROUND OF THE INVENTION

Podcasts are usually a longer format of media content and deciding whether a particular podcast episode is worth a listener's time is relatively difficult. A podcast episode description, typically provided by the podcast's creator, is a major driver when listeners are in the process of deciding to try a new show or episode. Creator-generated descriptions also often contain advertisements, social media links and other extraneous information which do not communicate the essence of that show or particular episode. Consequently, listeners are required to skip to different parts of a podcast show or particular podcast episode to understand what its content is about.

Generating a description of a podcast episode manually by those who did not create the podcast or those otherwise unfamiliar with the content typically involves skipping through the podcast episode and trying to find important parts. This is a time-consuming process especially for long podcast episodes (e.g., 3 hours long). Indeed, the process of writing an episode description can be tedious even for creators of podcasts.

Podcast episode descriptions in approximately 50% of the cases are considered to be fair or bad by trained evaluators, fair meaning that a podcast episode description conveys some attributes of the content but gives the reader an imperfect or incomplete sense of what the podcast episode contains. For example, the podcast episode description may contain some redundant material which is not relevant to the decision-making process of a listen. A "bad" description means that the podcast episode does not convey any of the most important content items of the episode or gives the reader an incorrect sense of what the podcast episode contains. It may contain a lot of redundant information that is not needed when deciding whether to listen to the podcast episode.

One technical challenge involves creating an informative summary of podcast episodes that will assist listeners in selecting which episodes to consume. Another technical challenge involves generating episode summaries automatically using as input training data from other episodes (e.g., other podcast episodes) and/or other types of media content (e.g., news articles).

Natural Language Processing (NLP) is a field of study in the intersection of computer science, linguistics and artificial intelligence. More specifically, the NLP community is interested in studying problems where computers are required to process languages created, used, and evolved by humans. The space of problems in NLP is vast but here are a few examples of current technical problems in the context of text analysis:

1. Summarization: producing a shorter version of one or several documents while preserving most of the input's meaning.
2. Translation: translating a sentence or document from one language to another without losing information.
3. Question Answering: the act of processing one or several documents and then answering questions that require text comprehension and information retrieval capabilities.
4. Sentence Classification: classify sentences or documents based on a set of predefined classes (e.g., positive sentiment, negative sentiment, neutral sentiment).

Automatic summarization of text transcripts of podcasts poses several additional unique technical challenges. Firstly, there are many podcast formats, such as: interview, debate, and monologue—formats. Secondly, podcast episode transcripts are noisy as the audio often contains fillers and overlapping speakers, and the resulting transcripts contain errors with automatic speech recognition (ASR) and inferred punctuation. Moreover, these transcripts are often very long, whereas state-of-the-art models are generally trained on short texts and can ingest only a limited number of tokens. A BERT model, for example, is a machine learning model that is able to cope with multiple NLP tasks such as supervised text classification without human supervision. BERT stands for Bidirectional Encoder Representations from Transformers. A typical full attention mechanism partitions or shortens the long context into smaller sequences that fall within the typical 512 token limit of BERT-style pre-trained models. Such partitioning could potentially result in loss of important cross-partition information. To mitigate this problem, existing methods often rely on complex architectures to address such interactions. Because of this limitation, using a typical full attention mechanism requires partitioning a relatively long transcript into several individual sentences. In addition, the sentences are typically filtered to retain only the important ones to feed into a model. However, this can be a computationally intensive and inefficient process.

Also, podcasts may be in different languages and different amounts of resources, such as training data and pretrained models are available across languages. Most machine learning models require large volumes of data to train. Training a machine learning model a new language for which there is not much data, and certainly from scratch, requires a relatively large amount of computing power and data. It would be preferable to train a model using as little computing power and data as possible. As such, it would be desirable to have a mechanism that enables the ability to summarize podcasts in various data settings, including when training data and/or pretrained summarization models are not available.

The task of summarization of podcasts has been addressed by training deep neural abstractive summarization models on a large scale set of podcast transcripts. One successful technique for performing such summarization, described in Karlbom et al., "Abstractive Podcast Summarization Using BART with Longformer Attention", published in the Proceedings of Text REtrieval Conference (TREC) 2020, involves using BART, a denoising auto-encoder for pretraining sequence-to-sequence models. To create a model for summarizing podcast transcripts a BART model was finetuned on a podcast transcript dataset. To address the length challenge of the input documents, the attention layers of the finetuned BART model were replaced with the attention mechanism used in a Longformer. A Longformer is a modified transformer architecture that has an attention mechanism that scales linearly with sequence length, making it relatively easier to process documents of thousands of tokens or longer. While a Longformer BART model (i.e., a monolingual model pretrained in English) works very well for monolingual podcast summarization in English, it cannot work for a multilingual summarization task.

Moreover, simply replacing a transformer model such as BART with a multilingual transformer model such as mBART-50 does not necessarily perform as expected. A multilingual model that has been exposed to many languages but not for any specific task and trained towards a specific task in a particular language, would typically be expected to be able to use the knowledge acquired by the training to complete that task in another language. But that is not the case. While training on a first language A in order to complete a task in a second language B produces better results when the languages are closely related, the less related the languages are the results become significantly worse. Accordingly, one technical challenge involves providing a mechanism that can utilize the features of a multilingual transformer model to enable the summarization of an episode (e.g., podcast episode) input in any language and output a useful (e.g., relatively accurate) summary in any other language. Another technical challenge involves providing a mechanism that can handle a summarization task when neither a multilingual transformer model is available at all. It would, therefore, be advantageous to have the capability of performing a summarization task on an episode in a particular language and output a summary in the same language, without unnecessary processing and as accurately as possible.

SUMMARY OF THE INVENTION

Generally, aspects of the embodiments described herein use a transcript of an episode (also referred to as an episode transcript) as input to automatically generate a summary of the episode (also referred to as an episode summary). In some embodiments, an encoder of a summarization system is configured to receive as input a query episode transcript (e.g., a transcript of an episode of a podcast) and a decoder of the summarization system operates to generate a summary of the query episode transcript. In an example implementation, the summarization system is a multilingual summarization system. In an example implementation, the encoder operates to generate a latent space representation (also known as a vector space representation or embedding space) of the query episode transcript based on the words of the query episode transcript. The latent space representation is, for example, in the form of a sequence of vectors that represent the sentences of the query episode transcript. The decoder, in turn, uses an attention mechanism of a finetuned Longformer multilingual transformer model to predict another sequence of words based on the sequence of vectors that the encoder has generated. This other sequence of words is the summary of the query episode transcript.

Filtering and processing of training data used to train a machine learning model unique to the summarization techniques described herein are also addressed.

In one example embodiment, a system for generating multilingual abstractive summaries is provided. The system comprises at least one processor configured to: receive a plurality of preprocessed episode descriptions in a plurality of languages; receive a plurality of episode transcripts, each episode transcript corresponding to at least one of the plurality of preprocessed episode descriptions; convert a full attention mechanism of a multilingual transformer model into a Longformer attention mechanism, thereby generating a Longformer multilingual transformer model; and finetune the Longformer multilingual transformer model to perform a summarization task using preprocessed episode-description:episode-transcript pairs, thereby generating a finetuned Longformer multilingual transformer model.

In some embodiments, the at least one processor of the system is further configured to: receive a query episode transcript; and generate a summary of the query episode transcript using the finetuned Longformer multilingual transformer model.

In some embodiments, the at least one processor of the system is further configured to: receive a query episode transcript; determine the language of the query episode transcript; and when the finetuned Longformer multilingual transformer model is not finetuned to the language of the query episode, generate a summary of the episode transcript using a translation model pretrained on the language of the query episode.

In some embodiments, the at least one processor of the system is further configured to: receive a query episode transcript; determine the language of the query episode transcript; and when the finetuned Longformer multilingual transformer model is not finetuned to the language of the query episode and a translation model pretrained on the language of the query episode is not available, tokenize a portion of the query episode transcript and select a predetermined number (T) of tokens to generate a summary of the episode transcript, where T is an integer.

In some embodiments, the multilingual transformer model is pre-trained for the task of translation on data in multiple languages. In some embodiments, the preprocessed episode-description:episode-transcript pairs are in multiple target languages.

In some embodiments, the at least one processor of the system is further configured to: finetune the Longformer multilingual transformer model to perform a summarization task based on article-summary:full-original-article pairs prior to finetuning the Longformer multilingual transformer model to perform a summarization task based on the preprocessed episode-description:episode-transcript pairs; and generate the summary of the query episode transcript using the finetuned Longformer multilingual transformer model.

In some embodiments, the at least one processor of the system is further configured to: evaluate the finetuned Longformer multilingual transformer model to generate an evaluation metric; and update the finetuned Longformer multilingual transformer model based on the evaluation metric.

In some embodiments, the at least one processor of the system is further configured to: evaluate the finetuned Longformer multilingual transformer model to generate an evaluation metric; and update the finetuned Longformer multilingual transformer model based on the evaluation metric.

In some embodiments, the multilingual transformer model is an mBart-50 model. In some embodiments, the multilingual transformer model is an mT5 model. mT5 (multilingual Text-to-Text Transfer Transformer) is a multilingual transformer model that can be pre-trained on a dataset covering multiple languages.

In some embodiments, the multilingual transformer model is finetuned to an XL-SUM dataset for the summarization task. In an example implementation, the mBart-50 model is finetuned to an XL-SUM dataset. In another example implementation, the multilingual transformer model is an mT5 model finetuned to an XL-SUM dataset.

In some embodiments, the at least one processor of the system is further configured to: receive a plurality of episode descriptions that are not preprocessed; remove an episode transcript from the plurality of episode transcripts that has a corresponding episode descriptions outside a predetermined boundary condition; and apply a term frequency-inverse document frequency (TF-IDF) vectorization operation to the plurality of episode descriptions to generate a similarity metric between at least a pair of episode descriptions and filter out one of the pair of episode descriptions if the similarity metric is within a predetermined threshold.

In some embodiments, the at least one processor of the system is further configured to apply a machine learning model to filter descriptions. In an example embodiment, the at least one processor of the system operates to assign, by applying a description (e.g., in the form of text) to a trained computational model, a score for each segment in the description, where the score corresponds to a predicted relevance of the respective segment to a narrative of the media content item to which the description corresponds; and use the assigned scores to identify a non-narrative segment within the description and filter out segments (e.g., such as the non-narrative segment) of the description.

In some embodiments, a method for generating multilingual abstractive summaries is provided. The method comprises, receiving a plurality of preprocessed episode descriptions in a plurality of languages; receiving a plurality of episode transcripts, each episode transcript corresponding to at least one of the plurality of preprocessed episode descriptions; converting a full attention mechanism of a multilingual transformer model into a Longformer attention mechanism, thereby generating a Longformer multilingual transformer model; finetuning the Longformer multilingual transformer model to perform a summarization task based on preprocessed episode-description:episode-transcript pairs, thereby generating a finetuned Longformer multilingual transformer model.

In some embodiments, the method further comprises: receiving a query episode transcript; and generating a summary of a query episode transcript using the finetuned Longformer multilingual transformer model.

In some embodiments, the method further comprises: receiving a query episode transcript; determining the language of the query episode transcript; and when the finetuned Longformer multilingual transformer model is not finetuned to the language of the query episode, generating a summary of the episode transcript using a translation model pretrained on the language of the query episode.

In some embodiments, the method further comprises: receiving a query episode transcript; determining the language of the query episode transcript; and when the finetuned Longformer multilingual transformer model is not finetuned to the language of the query episode and a translation model pretrained on the language of the query episode is not available, tokenizing a portion of the query episode transcript and selecting a predetermined number (T) of tokens to generate a summary of the episode transcript, where T is an integer.

In some embodiments, the multilingual transformer model is pre-trained on data in multiple languages. In some embodiments, the preprocessed episode-description:episode-transcript pairs are in multiple languages.

In some embodiments, the method further comprises: finetuning the Longformer multilingual transformer model to perform a summarization task based on article-summary: full-original-article pairs prior to finetuning the Longformer multilingual transformer model to perform a summarization task based on the preprocessed episode-description:episode-transcript pairs; and generating the summary of the query episode transcript using the finetuned Longformer multilingual transformer model.

In some embodiments, the method further comprises: evaluating the finetuned Longformer multilingual transformer model to generate an evaluation metric; and updating the finetuned Longformer multilingual transformer model based on the evaluation metric.

In some embodiments, the method further comprises: evaluating the finetuned Longformer multilingual transformer model to generate an evaluation metric; and updating the finetuned Longformer multilingual transformer model based on the evaluation metric.

In some embodiments, the multilingual transformer model is an mBart-50 model. In some embodiments, the multilingual transformer model is an mT5 model. mT5 (multilingual Text-to-Text Transfer Transformer) is a multilingual transformer model that can be pre-trained on a dataset covering multiple languages.

In some embodiments, the multilingual transformer model is finetuned to an XL-SUM dataset for the summarization task. In an example implementation, the mBart-50 model is finetuned to an XL-SUM dataset. In another example implementation, the multilingual transformer model is an mT5 model finetuned to an XL-SUM dataset.

In some embodiments, the method further comprises: receiving a plurality of episode descriptions that are not preprocessed; removing an episode transcript from the plurality of episode transcripts that has a corresponding episode descriptions outside a predetermined boundary condition; and applying a term frequency-inverse document frequency (TF-IDF) vectorization operation to the plurality of episode descriptions to generate a similarity metric between at least a pair of episode descriptions and filter out one of the pair of episode descriptions if the similarity metric is within a predetermined threshold.

In some embodiments, a machine learning model is used to filter descriptions. In an example embodiment, the method includes assigning, by applying a description (e.g., in the form of text) to a trained computational model, a score for each segment in the description, where the score corresponds to a predicted relevance of the respective segment to a narrative of the media content item to which the description corresponds; and using the assigned scores, identifying a non-narrative segment within the description and filtering out segments (e.g., such as the non-narrative segment) of the description.

In yet another embodiment, there is provided a non-transitory computer-readable medium having stored thereon one or more sequences of instructions for causing one or more processors (e.g., CPU(s) an/or GPU(s)) to perform one or more of the methods described herein.

BRIEF DESCRIPTION OF DRAWINGS

The features and advantages of the example embodiments of the invention presented herein will become more apparent from the detailed description set forth below when taken in conjunction with the following drawings.

FIG. 7 illustrates example multilingual summarizations according to three example use cases.

DETAILED DESCRIPTION OF THE INVENTION

Figure 1:
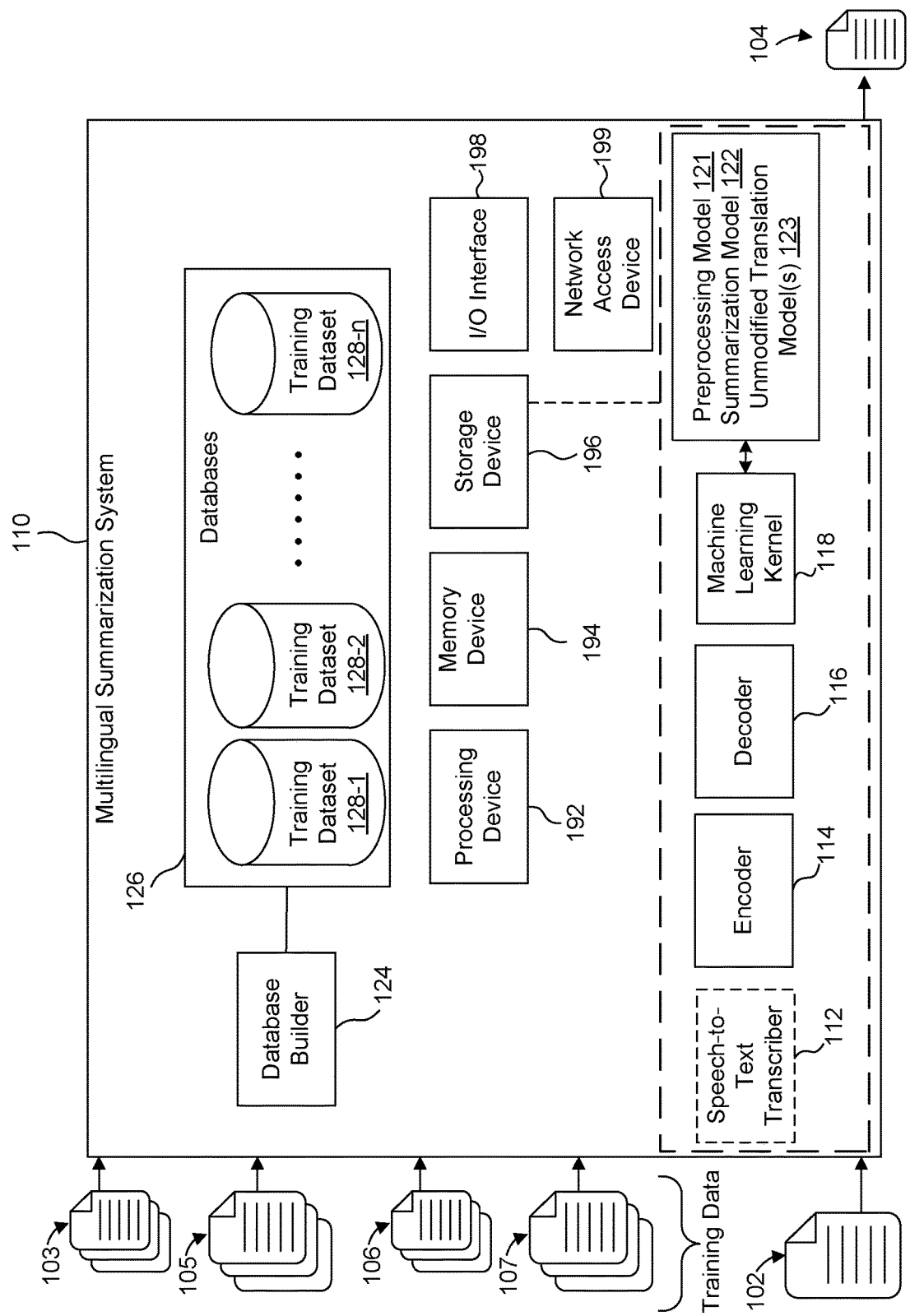
FIG. 1 is a system diagram of a summarization system according to an example embodiment.

The example embodiments presented herein are directed to systems, methods, and non-transitory computer-readable medium products for producing abstractive summaries from episode transcripts in multiple languages. The example embodiments are described in terms of producing summaries for podcast episodes. This is for convenience only and is not intended to limit the application of the present invention. After reading the following description, how to implement the following disclosure in alternative embodiments will be apparent to one skilled in the relevant art. For instance, although primarily described in the domain of podcasts, the techniques herein are applicable to other kinds of media content, such as other audio content (e.g., music containing lyrics, audiobooks), and video content (e.g., shows or movies), among other content capable of being transcribed. The techniques herein are also applicable to multilingual summarization of articles and books as well.

An episode, as used herein, is a program segment, represented by one or more media files, which is part of a series of related segments.

Generally, a pre-trained large-scale transformer-based model is used to perform natural language processing (NLP) tasks on a query episode transcript. The NLP tasks may include, for example, language translation, summarization, and text generation. A pre-trained large-scale transformer-based model that is pre-trained on data in multiple languages (e.g., 50 languages) to perform the language translation task is referred to as a multilingual transformer-based model. A multilingual transformer-based model that is trained to perform a translation task and not a summarization task is referred to as an unmodified translation model.

Typical transformer-based models are unable to process long sequences due to their self-attention operation, which scales quadratically with the sequence length. To address this limitation, a so called Longformer attention mechanism is implemented. Generally, a Longformer is a modified transformer architecture that has an attention mechanism that scales linearly with sequence length, making it relatively easier to process documents of thousands of tokens or longer. By converting the full attention mechanism of a multilingual transformer model into a Longformer attention mechanism, contextual representations of relatively long podcast episodes can be built using multiple layers of attention, reducing the need for task-specific architectures. Moreover, the memory consumption for full attention mechanism scales quadratically to the input sentence's length, whereas a Longformer's attention mechanism scales linearly. The benefit is that a summarization model based on a Longformer multilingual transformer model architecture can now process longer documents. This is at least in part because using a Longformer attention mechanism avoids the need for partitioning transcripts into individual sentences. This is advantageous in that the summarization tasks required for relatively long transcripts of episodes (e.g., podcast episodes) can be achieved without loss of important information. As explained above, however, one technical challenge involves providing a mechanism that can utilize the features of a multilingual transformer model to enable the summarization of an episode (e.g., podcast episode) input in any language and output a useful summary in any other language. It would also be advantageous, therefore, to have the capability of performing a summarization task on an episode in a particular language and output a summary in the same language, without unnecessary processing, and as accurately as possible. It has been found that a multilingual transformer model that is further trained to perform a summarization task using training data in a language of interest is significantly more accurate than using a multilingual transformer model that is trained to perform the summarization task but not trained in the language of interest. This creates another technical challenge of how to handle situations where a query episode is in a particular language but either (1) a multilingual model exists that is pre-trained for the translation task in the particular language and finetuned for the summarization task using training data in the particular language (2) a multilingual model exists that is pre-trained for the translation task in the particular language but not finetuned for the summarization task using training data in the particular language (i.e., not finetuned to the particular language), or (3) no model exists that is pre-trained in the particular language for the translation task nor trained in the particular language for the summarization tasks. To account for this, a mechanism that can account for the above three situations is provided, as described below in more detail in connection with FIG. 3 and FIG. 4.

In some embodiments, in addition to converting a full attention mechanism of a multilingual transformer model into a Longformer attention mechanism to generate a so-called Longformer multilingual transformer model, the Longformer multilingual transformer model is also finetuned to perform a summarization task based on episode-description:episode-transcript pairs, (e.g., n episode-description:episode-transcript pairs, where n is an integer) in a plurality of target languages (e.g., L target languages, where L is an integer), thereby generating a finetuned Longformer multilingual transformer model that is trained in L target languages, languages. A summary of a query episode transcript can then be obtained using the finetuned Longformer multilingual transformer model. This example implementation can be referred to as a single-finetuned variant or single-finetuned Longformer multilingual transformer model.

In another example implementation, the Longformer multilingual transformer model is further finetuned to perform a summarization task based on article-summary:full-original-article pairs. This example implementation can be referred to as a double-finetuned variant or double-finetuned Longformer multilingual transformer model. The summary of the query episode transcript can then be obtained by applying the query episode transcript to the finetuned Longformer multilingual transformer model, which in this example implementation the Longformer multilingual transformer model has been double finetuned.

In some embodiments, creator-provided episode descriptions are used as summarization training labels. How the training data is created can affect the performance of the downstream summarization model. In an example implementation, training based on the creator-provided episode descriptions is optimized for recall rather than for precision by setting a lower threshold for detecting instances of extraneous content. That is, the embodiments can be configured to remove too much (e.g., false positive instances of extraneous content) from the creator-provided description rather than not enough.

FIG. 1 is a system diagram of a multilingual summarization system 110 according to an example embodiment. In the example of FIG. 1, the multilingual summarization system 110 includes an encoder 114, a decoder 116, a machine learning kernel 118, a database builder 124, one or more databases (referred to individually and collectively as database 126), a processing device 192, a memory device 194, a storage device 196, an input/output (I/O) interface 198, and a network access device 199. In some embodiments, multilingual summarization system 110 also includes a speech-to-text transcriber 112.

In an example embodiment, the processing device 192 also includes one or more central processing units (CPUs). In another example embodiment, the processing device 192 includes one or more graphic processing units (GPUs). In other embodiments, the processing device 192 may additionally or alternatively include one or more digital signal processors, field-programmable gate arrays, or other electronic circuits as needed.

The memory device 194 (which as explained below is a non-transitory computer-readable medium), coupled to a bus, operates to store data and instructions to be executed by processing device 192. The instructions, when executed by processing device 192 can operate as encoder 114, decoder 116, and/or machine learning kernel 118. The memory device 194 can be, for example, a random-access memory (RAM) or other dynamic storage device. The memory device 194 also may be used for storing temporary variables (e.g., parameters) or other intermediate information during execution of instructions to be executed by processing device 192.

The storage device 196 may be a nonvolatile storage device for storing data and/or instructions for use by processing device 192. The storage device 196 may be implemented, for example, with a magnetic disk drive or an optical disk drive. In some embodiments, the storage device 196 is configured for loading contents of the storage device 196 into the memory device 194.

I/O interface 198 includes one or more components which a user of the multilingual summarization system 110 can interact. The I/O interface 198 can include, for example, a touch screen, a display device, a mouse, a keyboard, a webcam, a microphone, speakers, a headphone, haptic feedback devices, or other like components.

Examples of the network access device 199 include one or more wired network interfaces and wireless network interfaces. Examples of such wireless network interfaces of a network access device 199 include wireless wide area network (WWAN) interfaces (including cellular networks) and wireless local area network (WLANs) interfaces. In other implementations, other types of wireless interfaces can be used for the network access device 199.

The network access device 199 operates to communicate with components outside the multilingual summarization system 110 over various networks. Such components outside the multilingual summarization system 110 can be, for example, one or more sources of episode descriptions 103 and one or more sources of episode transcripts 105.

The database 126 is, in some embodiments, also configured to store other data used by encoder 114, decoder 116, and/or machine learning kernel 118. Database 126 can also be located on a system independent of, but communicatively coupled to, multilingual summarization system 110.

As shown in FIG. 1, database 126 includes at least one training dataset: training dataset 128-1, training dataset 128-2, . . . , training dataset 128-n. Training dataset 128-1, training dataset 128-2, . . . , and training dataset 128-n are individually and collectively referred to as training dataset 128. The machine learning kernel 118 uses the training dataset 128 to train machine learning models (e.g., preprocessing model 121 and summarization model 122) on episode descriptions 103 and episode transcripts 105. In some embodiments, after many iterations, the models trained by machine learning kernel 118 become better trained for performing their parts in providing a summarization of content (e.g., podcast content). A query episode is an episode for which a summarization is requested. The query episode is in a form that multilingual summarization system 110 can process. For example, the episode query can be in the form of a transcript that can be tokenized (e.g., by encoder 114 and/or decoder 116) and further processed as described herein. In the example implementation described herein, the query episode is in the form of a query episode transcript and referred to herein and depicted in the figures as query episode transcript 102. Alternatively, the episode can be in the form of an audio media content item (including an audio-visual content item), in which case the media content item is processed by speech-to-text transcriber 112 to generate a transcript that can be tokenized (e.g., by encoder 114 and/or decoder 116) and further processed as described herein.

Database 126 can also store additional data, such as data related to the query episode transcript 102 or episode summary 104. Database 126 can thus be dynamic and accumulate additional data over time. In turn, the accumulated additional data can be used to further train the models described herein.

In some embodiments, memory device 194 and/or storage device 196 operate to store instructions, which when executed by one or more processing devices 192, cause the one or more processing devices 192 to operate as encoder 114, decoder 116, and/or machine learning kernel 118. In some implementations, machine learning kernel 118 includes a preprocessing model 121, a summarization model 122, and unmodified translation model(s) 123. Machine learning kernel 118 including preprocessing model 121, summarization model 122 and unmodified translation model(s) 123 can alternatively be stored in a separate memory device or on a device or system communicatively coupled to multilingual summarization system 110 (e.g., via network access device 199.

As used herein, a preprocessing model 121 is a model used to filter episode descriptions generated by, for example, creators of episodes (e.g., podcast episodes). In some implementations, creator-provided descriptions of episodes are applied to preprocessing model 121 to detect extraneous content and/or to filter (e.g., clean) the creator-provided descriptions. In some embodiments, the preprocessing model 121 operates as a binary classifier.

As used herein, a summarization model 122 is a model that is finetuned to perform a summarization task. A summarization model 122 can be based on different types of architectures. In the embodiments described herein, the underlying model architecture on which the summarization model is built is the architecture of a multilingual transformer-based model such as mBart-50 or an mT5 (multilingual Text-to-Text Transformer) finetuned to the XL-SUM dataset. The underlying model on which the summarization model is built, in some, cases may still be used for the task of translation but for summarization. A multilingual transformer-based model that is pre-trained for a translation task is referred to herein as unmodified translation model 123.

In some embodiments, the summarization model 122 is based on the architecture of a multilingual transformer-based model such as mBart-50 or an mT5 (multilingual Text-to-Text Transformer) model finetuned to an XL-SUM dataset. In some embodiments, summarization model 122 is a finetuned Longformer multilingual transformer model trained for the task of summarization on n-episode description:episode transcript pairs in L target languages, where n and L are integers.

In some use cases, the finetuned Longformer multilingual transformer model (i.e., summarization model 122) may be trained in multiple languages (e.g., 50 languages) for a translation task but only for a subset of the multiple languages (e.g., 3 languages) for the summarization task. Thus, in certain use cases it may be the case that the summarization model 122 is not trained on data in a particular language at runtime for a summarization task. As explained below in more detail in connection with FIG. 3 and FIG. 4, it may be necessary to select an unmodified translation model 123 that is pre-trained to perform a translation task in that particular language. In other words, the unmodified translation model 123 is not used to perform the summarization task because it has not been finetuned to data in that language.

Episode descriptions 103 and episode transcripts 105 can be stored by database builder 124 into a training dataset 128 to be used by machine learning kernel 118 to train models such as the preprocessing model 121 and/or summarization model 122. Article summaries 106 and corresponding original articles 107 also can be stored by database builder 124 into a training dataset 128 to be used by machine learning kernel 118 to train (i.e., finetune) models such as the preprocessing model 121 and/or summarization model 122.

In some embodiments, unmodified translation model(s) 123 are pre-trained. As a result, training data are not needed to further train the unmodified translation model(s) 123 to perform a translation task.

In an example embodiment, storage device 196 of multilingual summarization system 110 is configured to store the latent space representation and tokens generated by the encoder 114 and decoder 116.

It should be noted that the multilingual summarization system 110 may include other components not expressly identified here.

Figure 2:
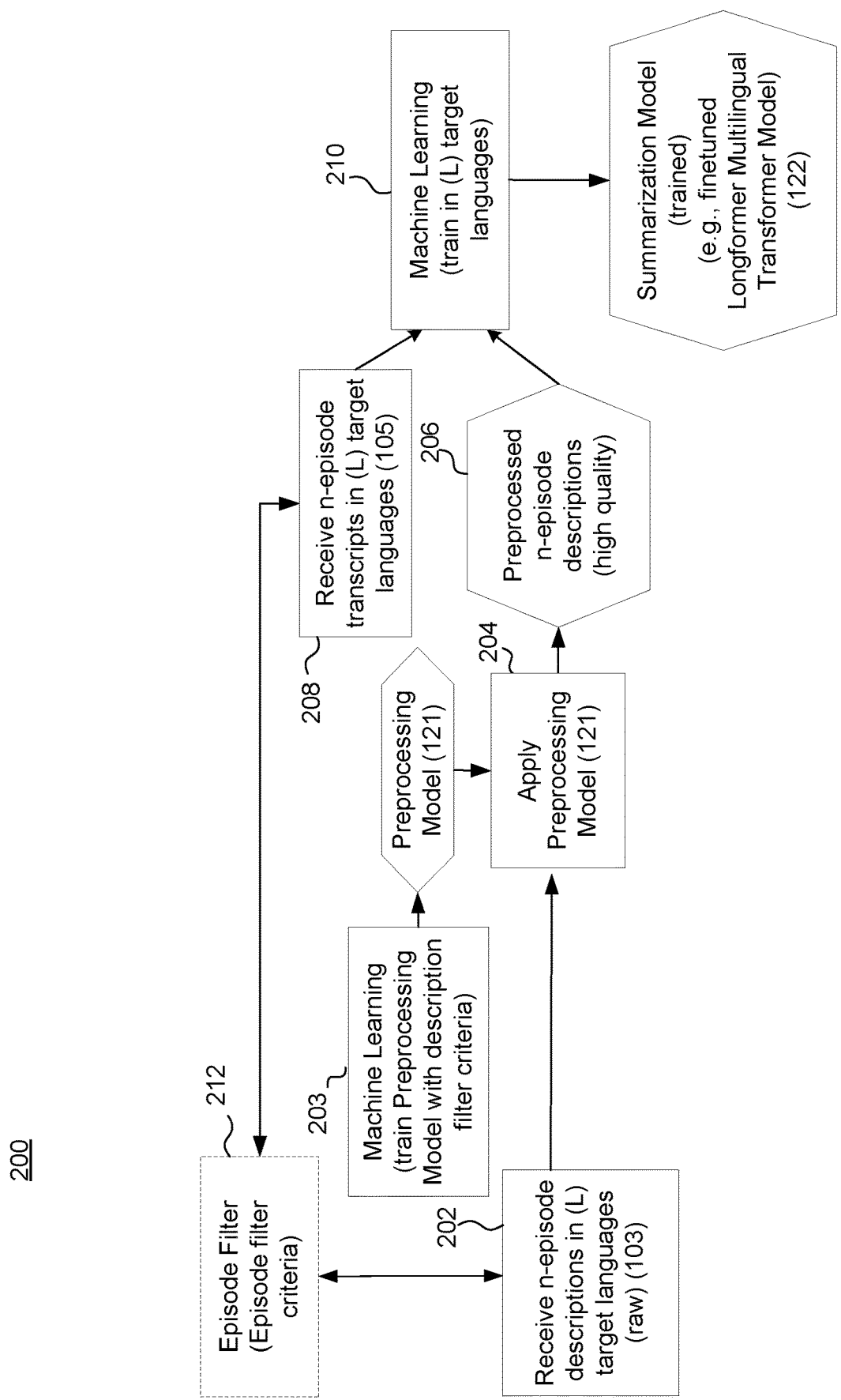
FIG. 2 is a diagram illustrating a training process according to an example embodiment.

FIG. 2 is a process diagram illustrating a training process 200 according to an example embodiment. The training process 200 is now described with reference to FIG. 1 and FIG. 2. An episode description receiving operation 202 begins the training process 200 by receiving plural episode descriptions 103. In an example implementation, episode descriptions 103 have been generated by respective creators of the episodes. In an example implementation, the episode descriptions are saved as a dataset 128 and stored in database 126. The episode descriptions 103 generated by a creator of the episode are not yet filtered or otherwise processed and sometimes referred to as raw episode descriptions (e.g., n-episode descriptions 103 in L target languages, where n and L are integers).

Preprocessing model training operation 203, which in an example implementation is performed by machine learning kernel 118 of the multilingual summarization system 110, performs a training operation to train a preprocessing model 121 with description filter criteria. In some embodiments, preprocessing model 121 is simply programmed to perform filtering without the need for machine learning training. In either case, the preprocessing model 121 is, in turn, applied to the raw episode descriptions to filter the raw episode descriptions as shown by preprocessing model application operation 204. In some embodiments, preprocessing model 121 operates to filter raw episode descriptions by removing extraneous content such as advertisements or boilerplate text from the raw episode descriptions 103 received during episode description receiving operation 202.

In an example embodiment, sentences from episode descriptions are labeled as either "extraneous" data or "not extraneous" data. These labeled data are, in turn, used by the machine learning kernel 118 to train the preprocessing model 121 (e.g., a binary classifier) to detect extraneous content and use the preprocessing model 121 to filter (e.g., clean) the creator-provided descriptions in podcasts. Some examples of extraneous content found in episode descriptions that can be used as filter criteria to train the preprocessing model 121 include:

Universal Resource Locators that enable users to send voice messages or greetings after they have listened to a podcast.
Requests for followers on social media
Advertisements
List of technical staff (producer, editor, sound technician, etc.)
Hashtags to characterize or promote the content
Credits to the soundtrack used during the episode
Time marks such as "0:30<topic 1> 1:25<topic 2> 5:40<topic 3>"
License information such as Creative Commons license
List of participants described by their, e.g., Twitter or Instagram
Usernames The trained preprocessing model 121 is applied to the raw episode descriptions 103 to generate filtered episode descriptions, as shown by preprocessing model application operation 204. In turn, encoder 114 generates latent space representations of the filtered episode descriptions. The latent space representations of episode descriptions that have been encoded by encoder 114 and applied to preprocessing model 121 are referred to as preprocessed episode descriptions 206. In the example illustration depicted in FIG. 2, there are n-episode descriptions 206 that are preprocessed, where n is a integer.

In some embodiments, the preprocessed episode descriptions 206 are stored in a training dataset 128.

In some embodiments, episode transcripts 105 are received by the multilingual summarization system 110. The preprocessed episode descriptions 206 are associated with identifiers that enable the preprocessed episode descriptions to be paired with corresponding episode transcripts 105 that are also labeled with identifiers. The pairing results in a plurality of preprocessed episode-description:episode-transcript pairs (e.g., preprocessed n-episode-description:episode-transcript pairs, where n is an integer). The machine learning kernel 118, in turn, is executed to train a summarization model 122 using the preprocessed episode descriptions 206 that have been paired with corresponding episode transcripts 105 (i.e., the preprocessed episode-description:episode-transcript pairs), as shown by machine learning operation 210. As explained above, a finetuned Longformer multilingual transformer model is also referred to as a summarization model 122. In some embodiments, the finetuned multilingual transformer model can be trained for the summarization task using training data in L target languages, where L is an integer.

In some embodiments, episodes are received in their native format (e.g., audio, video), filtered based on episode filter criteria as described above in connection with the raw episode descriptions, and then transcribed by speech-to-text transcriber 112 to build a training dataset 128 of episode transcripts 105. The training dataset 128 can be stored in database 126. The episodes transcripts can be labeled with identifiers (IDs) and the IDs of the transcribed episodes can, in turn, be mapped to corresponding episode descriptions (e.g., the preprocessed episode descriptions 206).

Figure 3:
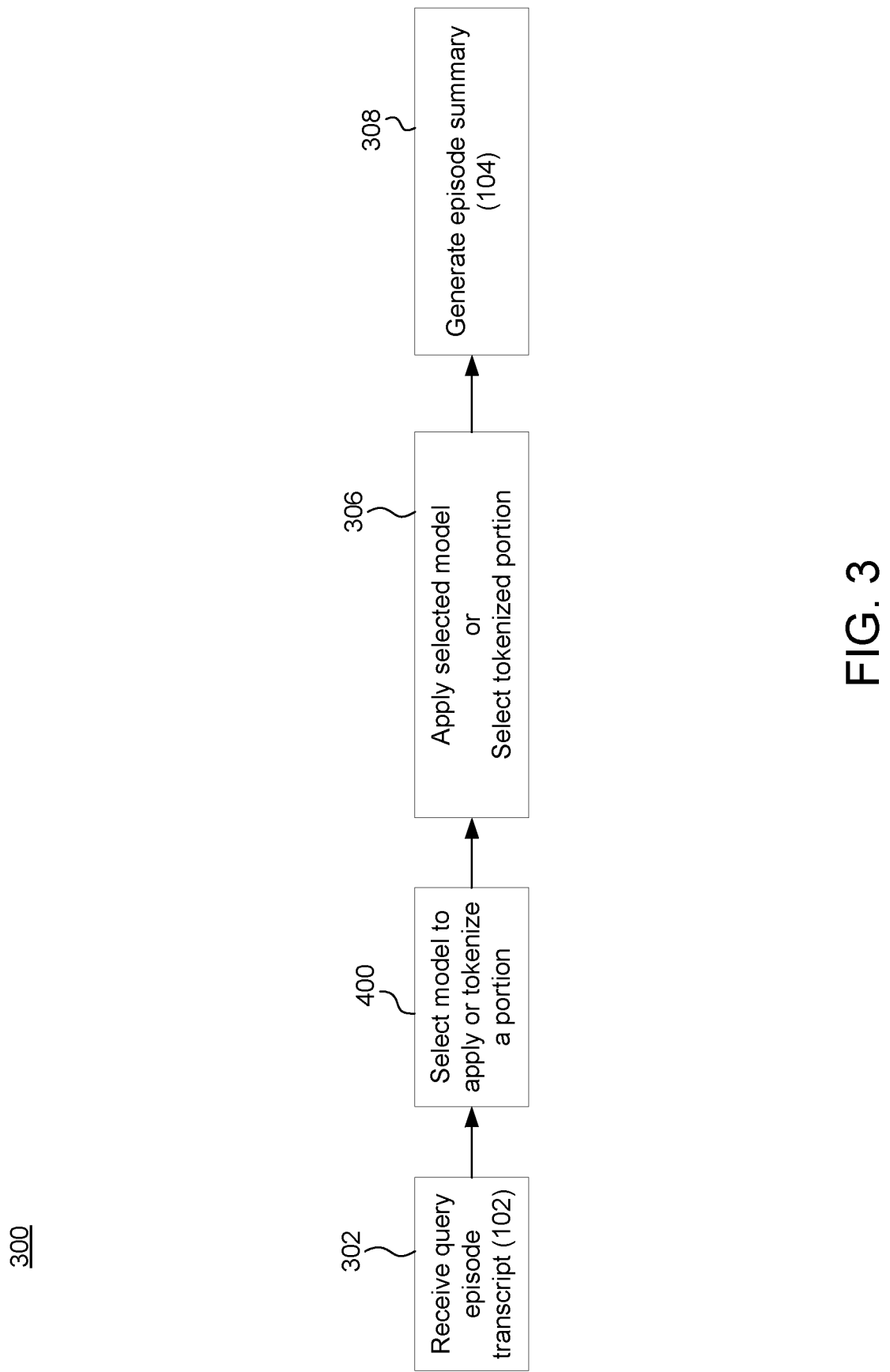
FIG. 3 is a diagram illustrating an inference process according to an example embodiment.

FIG. 3 is a process diagram illustrating an inference process 300 according to an example embodiment. In an example implementation, a query episode transcript 102 is received by the multilingual summarization system 110, as shown by query episode receive operation 302.

In some embodiments, the inference process 300 operates to generate (e.g., by the encoder 114) a sequence of vectors that represent the sentences of the query episode transcript 102. In turn, either a model is selected to apply the query episode transcript 102 or a portion of the query episode transcript is tokenized as shown in query episode processing operation 400. Query episode processing operation 400 is described in more detail below in connection with FIG. 4. Upon a determination by the query episode processing operation 400 which processing operation to perform on the query episode transcript, the inference process 300 generates an episode summary 104, as shown in generate episode summary operation 308. The episode summary 104 can be provided in a number of ways. In an example embodiment, the episode summary 104 is communicated via network access device 199 to a user device to be presented (e.g., via audio or video).

Figure 4:
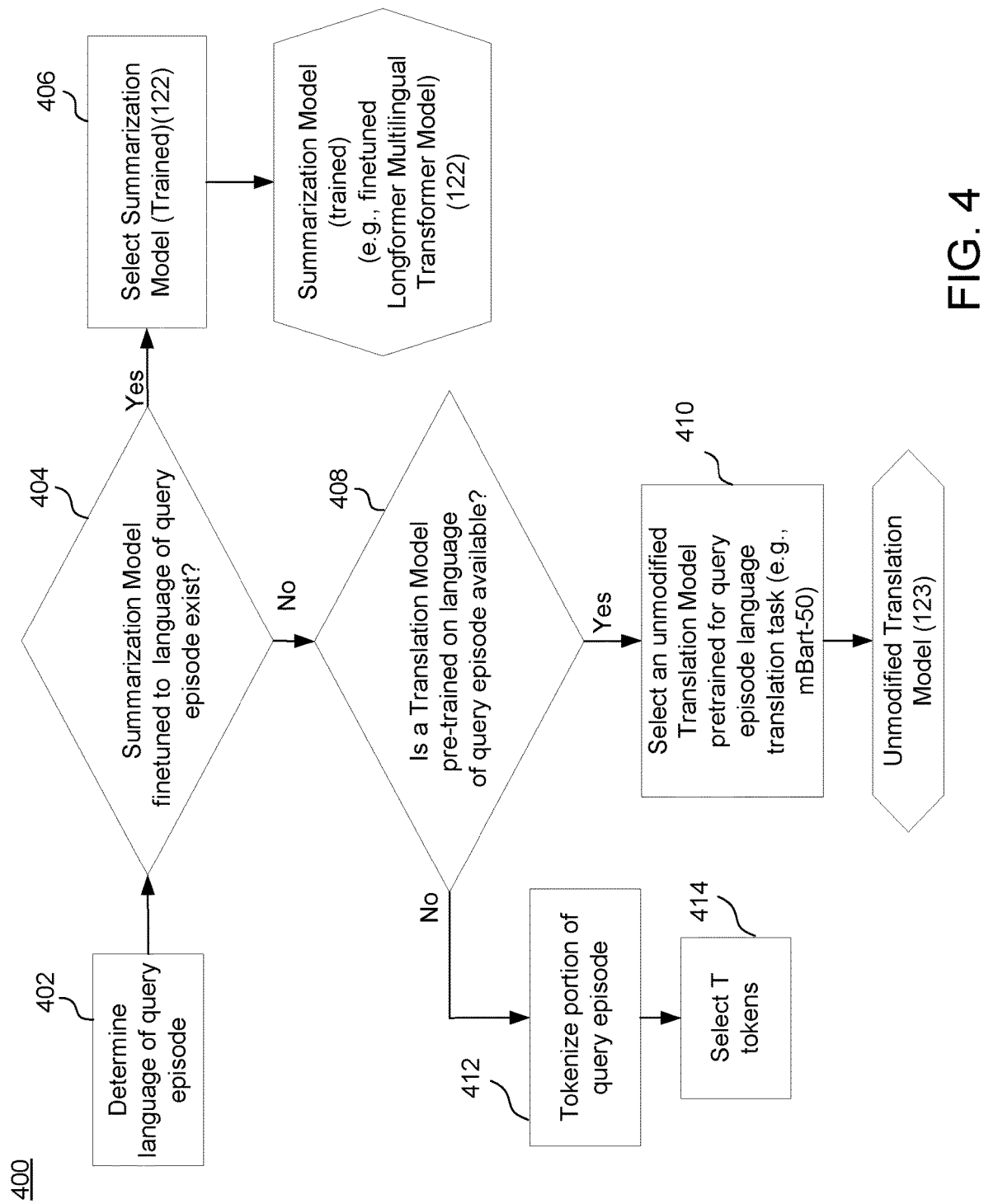
FIG. 4 illustrates a query episode processing operation that is executed during inference time according to an example embodiment.

FIG. 4 further illustrates the query episode processing operation 400 described above in connection with FIG. 3 according to an example embodiment. Query episode processing operation 400 is executed during inference time.

Generally, the sequence of vectors that represents the sentences of a query episode transcript 102 is (1) applied (e.g., by the decoder 116) to either (a) summarization model 122 (e.g., a finetuned Longformer multilingual transformer model) to generate a sequence of words that are the summary of the query episode transcript, (b) an unmodified translation model 123, or (2) tokenized without being applied to the summarization model 122 or any of the unmodified translation models 123.

As shown in FIG. 4, a language detection operation 402 operates to determine the language of the query episode. A finetuned summarization model availability determination operation 404 determines whether a summarization model that is finetuned to the language of the query episode exists. If the finetuned summarization model availability determination operation 404 determines that a summarization model that is finetuned to the language of the query episode exists, then summarization model is selected at select summarization model operation 406. If the finetuned summarization model availability determination operation 404 determines that a summarization model in the language of the query episode does not exist, then a determination is made whether a translation model that is pre-trained on the language of the query episode is available, as shown in translation model availability determination operation 408. If a determination is made by translation model availability determination operation 408 that a translation model pre-trained in the language of the query episode is available, then unmodified translation model selection operation 410 selects that translation model to use, unmodified. The translation model that is used unmodified is referred to herein as an unmodified translation model. The unmodified translation model is pre-trained in the language of the query episode to perform a translation task.

In some embodiments, when an unmodified translation model is used the query episode transcript 102 is cropped. For example the first two sentences of the query episode transcript 102 can be extracted and used as the summary.

If a determination is made by translation model availability determination operation 408 that a translation model in the language of the query episode is not available, then the episode summary is generated by tokenizing a portion of the query episode as shown in tokenization operation 412 and by selecting a predetermined number (T, where T is an integer) of tokens as shown in token selection operation 414. In some embodiments, the episode summary is then supplied, e.g., to a user device via network access device 199.

Figure 5:
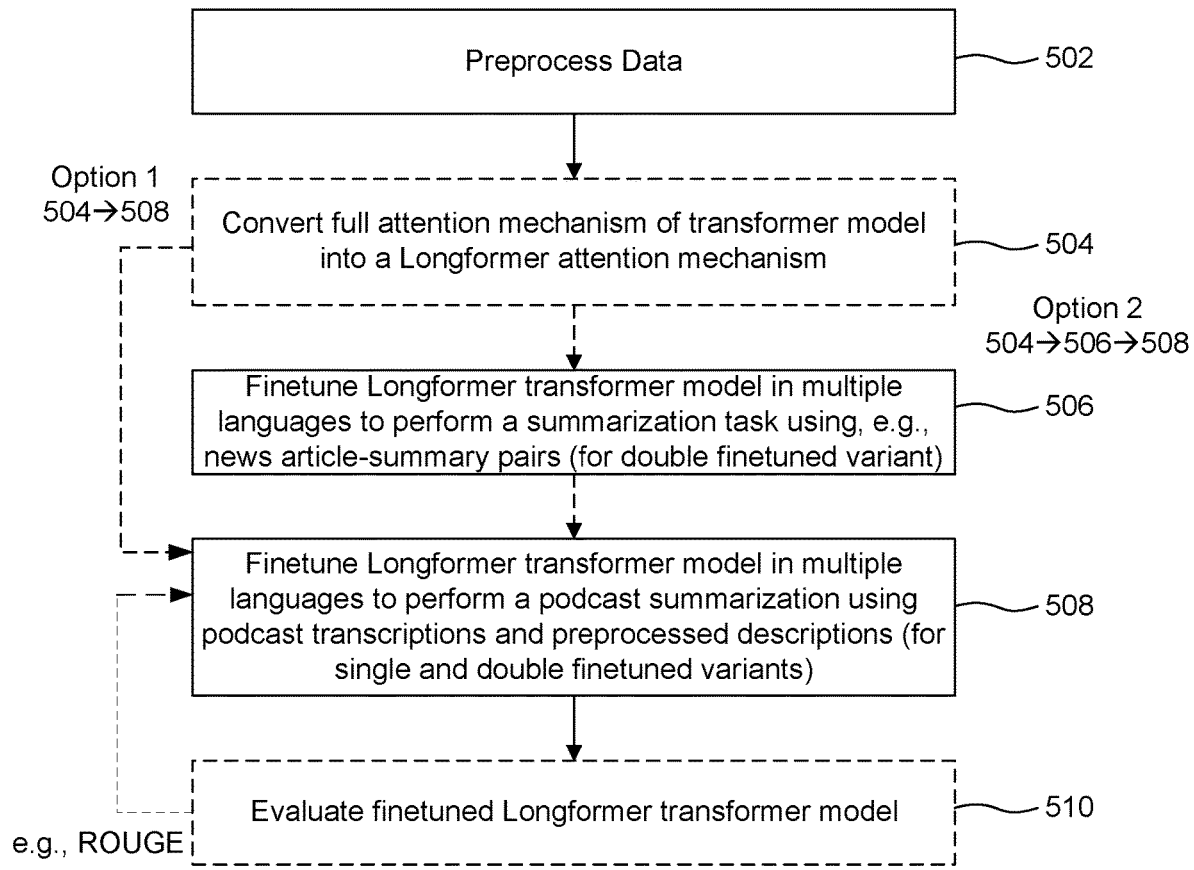
FIG. 5 is a flowchart illustrating a process for generating summaries using a multilingual transformer model according to an example embodiment.

FIG. 5 is a flowchart illustrating a process 500 for generating summaries using a multilingual transformer model such as mBART-50 or an mT5 model finetuned to the XL-SUM dataset, according to an example embodiment.

mBART (the predecessor of the mBart-50 model) is a sequence-to-sequence denoising auto-encoder pre-trained on large-scale monolingual corpora in many languages using the BART objective. The mBART-50 model is a multilingual sequence-to-sequence model that uses so-called multilingual finetuning of pre-trained models. The multilingual features of mBART-50 significantly reduce the computer resources needed to perform the operations described herein for generating summaries of query episodes because the mBART-50 is preconfigured to perform translation tasks for up to 50 languages. Thus, the translation capabilities of the mBart-50 model are not used during the finetuning described herein. Other models that have been pre-trained to encode text in multiple languages can be used instead of mBART-50.

Transcripts of episodes (e.g., podcast episodes) can be noisy in that they contain mispunctuation, unintended words, and/or artifacts caused by, for example speech impediments or filler sounds (e.g., "um", "er", "like", "you know", etc.). In some embodiments, a model is trained to denoise such noise. The mBart-50 model is an example of a model that is pre-trained to denoise.

As shown in FIG. 5, a preprocessing operation 502 is performed on raw episode descriptions (FIG. 1, 103) to prepare the raw episode descriptions data and make the raw episode descriptions suitable for use with a machine learning model. This is accomplished by receiving raw episode descriptions 103 (e.g., generated by a creator of the episodes) and applying a filter to the raw episode descriptions using a preprocessing model 121 described above. The preprocessed episode descriptions are, in turn, transformed into vector representations such that machine learning can be applied to the vector representations.

More specifically, episode transcripts and preprocessed episode descriptions are processed by a machine learning sub-system to train a summarization model. The episode transcripts and preprocessed episode descriptions are, in some embodiments, paired. In an example implementation there are n-pairs, where n is an integer. More details as to the operations of the preprocessing operation 502 will be described below in connection with FIG. 6.

In some embodiments, the data is intermingled in different languages (e.g., in English and Portuguese). This advantageously helps avoid so called catastrophic interference. Catastrophic interference, also known as catastrophic forgetting, is the tendency of an artificial neural network to completely and abruptly forget previously learned information upon learning new information.

As described above, a multilingual transformer-based model is a deep learning model that adopts the mechanism of self-attention, differentially weighting the significance of each part of the input data. Multilingual transformer-based models are typically unable to process long sequences due to their self-attention operation, which scales quadratically with the sequence length. To address this limitation, a so-called Longformer with an attention mechanism that scales linearly with sequence length is used, making it easy to process documents of thousands of tokens or longer. The attention mechanism of a Longformer mechanism is a drop-in replacement for the standard self-attention and combines a local windowed attention with a task motivated global attention.

The mBart-50 model essentiality takes an input text of length X (where X is an integer) in one language and outputs an output text of length X, where the output text is a translation of the input text. In some embodiments, a conversion operation 504 is performed to convert the full attention mechanism of the multilingual transformer model (e.g., a mBart-50 model) into a Longformer attention mechanism. The conversion of the multilingual transformer model (e.g., mBart-50 model) full attention mechanism by the conversion operation 304 generates a so called Longformer multilingual transformer model. In an example implementation using the mBart-50 model, this could be called the Longformer mBart-50 model.

The multilingual transformer model is limited to a predetermined size (e.g., 512 tokens in the case of an mBart-50 model). By converting the full attention mechanism of the multilingual transformer model into a Longformer attention mechanism to generate the Longformer multilingual transformer model, relatively greater length text can be input into the Longformer multilingual transformer model than can be input into the multilingual transformer model itself.

Conversion operation 504 can occur concurrently with preprocessing operation 502 and thus need not be sequentially after preprocessing operation 502.

In some embodiments (depicted as Option 1 in FIG. 5 with reference to operations 504 and 508), after conversion operation 504 is performed, a finetuning operation 508 is performed on the Longformer multilingual transformer model. Finetuning operation 508 results in a finetuned Longformer multilingual transformer model that has been trained on plural podcast transcriptions and the preprocessed episode descriptions (FIG. 2, 206) in two or more target languages to provide episode (e.g., podcast episode) summaries in any of the target languages. This example embodiment is referred to as a single-finetuned variant or single-finetuned Longformer multilingual transformer model.

In other example embodiments (depicted as Option 2 in FIG. 5; with reference to operations 504, 506 and 508), an additional finetuning operation is performed. Finetuning operation 506 is performed after the conversion operation 504 and before the finetuning operation 508. After the conversion operation 504 is performed to convert the full attention mechanism of the multilingual transformer model (e.g., mBart-50 model) into a Longformer attention mechanism, finetuning operation 506 is performed to convert the Longformer multilingual transformer model to a summarization task that is trained on, for example, article-summary: full-original-article pairs in two or more target languages (e.g., where the articles are news articles). In, turn, the finetuning operation 508 is performed on the Longformer multilingual transformer model to provide episode (e.g., podcast episode) summarization based on episode transcripts 105 and the preprocessed episode descriptions 206 in any of the target languages. This example embodiment is referred to as a double-finetuned variant or double-finetuned Longformer multilingual transformer model.

In both embodiments an mBART-50 model can be used as a pre-trained multilingual transformer model. In an example implementation, the mBART-50 model is pre-trained on n-languages, where n is an integer. The mBART-50 model can translate, for example, English to 49 other languages. To translate into a target language, a target language identifier is forced as the first generated token.

In some embodiments, an evaluation operation 510 is performed on the results of the finetuning (e.g., either the single finetuned variant: Option 1; or the double-finetuned variant: Option 2). In some embodiments, the results of the evaluation can, in turn, be fed back into the finetuned Longformer multilingual transformer model (either the single finetuned variant or the double-finetuned variant) to adjust the model (i.e., improve the model).

In one embodiment, the evaluation operation 510 can be a manual operation, in which experts evaluate the summarizations and provide a score rating the summarization. The score can be fed into the Longformer multilingual transformer model to improve its accuracy.

In another embodiment, the evaluation operation 510 can be automatic, in which a machine generates the score that can, in turn, be fed back into the Longformer multilingual transformer model to improve accuracy. ROUGE, or Recall-Oriented Understudy for Gisting Evaluation, is a set of metrics and a software package used for evaluating automatic summarization and machine translation software in natural language processing. The metrics compare an automatically produced summary or translation against a reference or a set of references (human-produced) summary or translation. In an example implementation, ROUGE can be used to perform the automatic evaluation of the summarization mechanisms described herein. Other automatically produced evaluators can be used instead of ROUGE and still be within the scope of the embodiments described herein.

In yet other embodiments no feedback is performed. That is, feedback can be optional.

Figure 6:
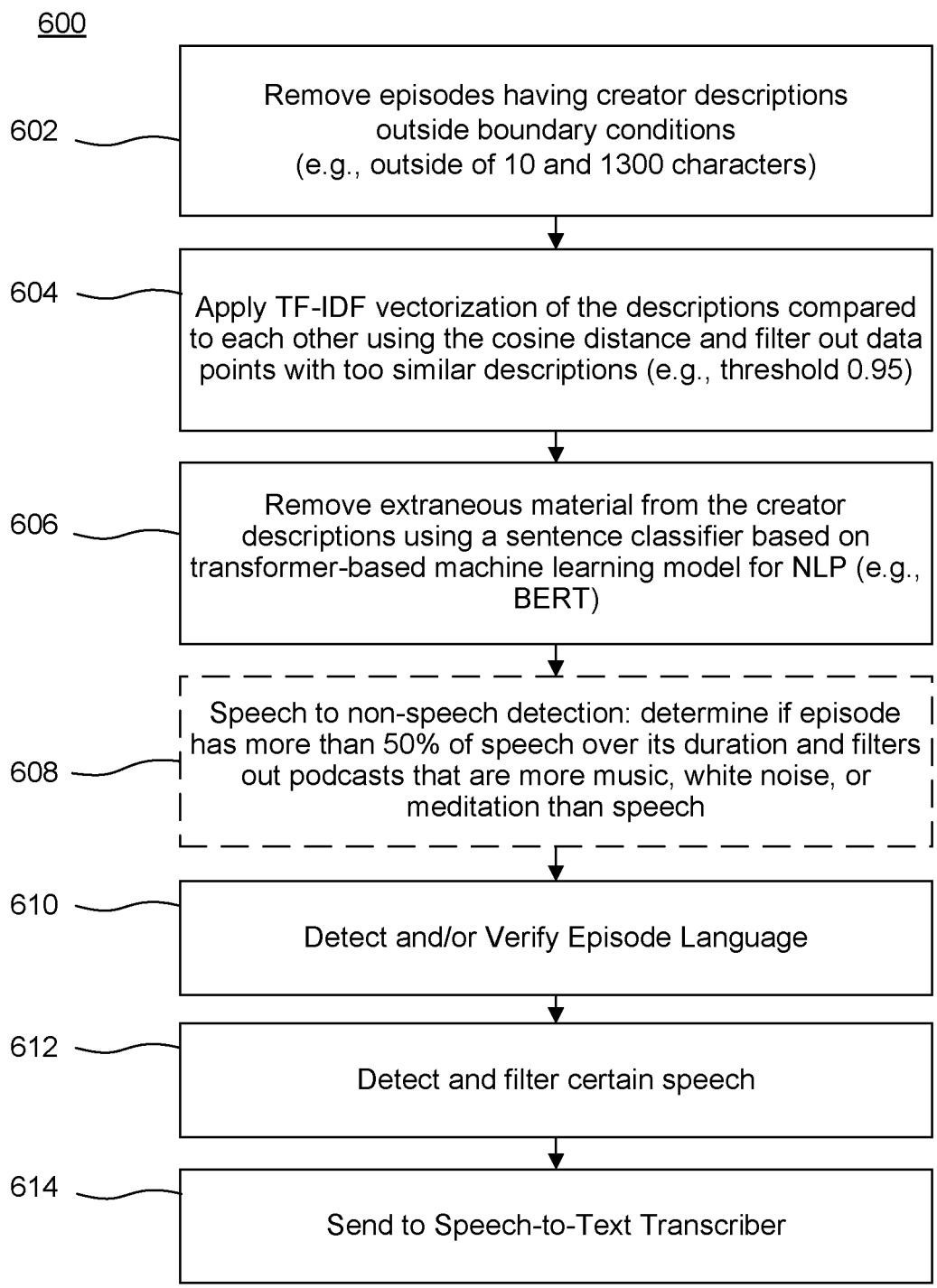
FIG. 6 is a flowchart illustrating a process for preparing episodes and episode descriptions to be used for training a model incorporated in a summarization system according to an example embodiment.

FIG. 6 is a flowchart illustrating a process 600 for filtering episodes and episode descriptions to be used for training a model incorporated in a summarization system according to an example embodiment. When described in connection with preprocessing the raw episode descriptions 103, the filter criteria are referred to as description filter criteria. When described in connection with filtering episodes (in their native format) or episode transcripts, the filter criteria are referred to as episode filter criteria.

In some embodiments, a character length filter operation 602 is performed based on the length of the creator-provided episode descriptions. In an example implementation, character length filter operation 602 removes episodes that have creator-provided episode descriptions outside a predetermined boundary condition (e.g., that are either too long or too short in length). In one example implementation of the character length filter operation 602, the boundary condition is set to between 10 and 1300 characters. In an example implementation, plural unprocessed episode descriptions are paired with episode transcripts (e.g., unprocessed episode descriptions:episode-transcript pairs). Any unprocessed episode descriptions:episode-transcript pair that has an episode description outside a predetermined boundary condition (e.g., that are either too long or too short in length so as outside the range of 10-1300 characters) is, in turn, removed.

In some embodiments, a term frequency-inverse document frequency (TF-IDF) vectorization operation 604 is applied to the creator-provided episode descriptions to provide a numerical statistic that reflects how important a word is in the creator-provided description. In an example implementation of the TF-IDF vectorization operation 604, the creator-provided episode descriptions are converted to TF- IDF vectors and the resulting TF-IDF vectorization of the descriptions are compared to each other using the cosine distance and data points with too similar descriptions are filtered out (e.g., a threshold 0.95). In an example implementation, when any two unprocessed episode descriptions are similar to each other one can be removed from the set of training data.

Podcast episode descriptions often contain material extraneous to the main content, such as advertisements, interleaved within the audio and the written descriptions. In some embodiments, an extraneous material removal operation 606 is performed to remove extraneous material, e.g., boilerplate sentences, from the creator-provided episode descriptions. In an example implementation, extraneous material removal operation 606 uses a sentence classifier based on BERT (Bidirectional Encoder Representations from Transformers). The classifier can be trained using a small set of, for example, manually labelled episodes.

In some embodiments, a speech to non-speech detection operation 608 is performed on the native version of an episode to determine if the episode (e.g., of a podcast) has more than 50% of speech over its duration. If the speech to non-speech detection operation 608 determines that an episode has less speech than, e.g., music, white noise, or meditation, it will filter out that episode.

In some embodiments, a language detection operation 610 detects the language of an episode. In an example implementation, a language verifier is used to predict a language by reading at least a portion of an episode description text. In some embodiments, an extra confirmation operation can be performed to confirm the predicted language. If the predicted language is confirmed (e.g., with a 95% confidence), the episode is used for training. Otherwise (e.g., if the predicted language is not confirmed, the episode is discarded.

In an example implementation, the language of an episode can be a parameter required to send with episodes to be transcribed.

It should be understood that other mechanisms for detecting language can be used and still be within the scope of the embodiments described herein.

In some embodiments, a speech detector is included. A speech detector operates to perform an automated task of detecting if a piece of text contains speech that has been predetermined should be filtered out. Operation 612 removes any descriptions with such speech to prevent the transformer-based model from being trained on that type of text. Preventing the transformer-based model from being trained on such text inhibits that text from being replicated in a summary of a query episode. An example of such speech predetermined to be filtered out is explicit speech.

In turn, operation 614 sends the remaining episodes to a speech-to-text transcriber, such as speech-to-text transcriber 112 described above in connection with FIG. 1. In turn, the transcripts resulting from the transcription operation performed by speech-to-text transcriber 112 are saved as a training dataset 128 and stored in database 126 to be paired with the preprocessed episode descriptions and the pairs of data are used by a machine learning process to train the summarization model 122.

In some embodiments, operation 614 is not necessary if a transcription already exists. In that case, the pre-existing transcription is saved as a training dataset 128 and stored in database 126.

It should be understood other multilingual transformer-based encoder-decoder models pre-trained on multiple languages could serve as a replacement for mBART-50. For example, in some embodiments, an mT5 model finetuned to the XL-SUM dataset is used as a multilingual pre-trained model instead of mBART-50. An mT5 model finetuned to the XL-SUM dataset is a massive multilingual summarization model trained in 44 languages. Thus, instead of finetuning an mBART-50 model, the mT5 model finetuned to the XL-SUM dataset can be used in its place.

Typical transformer-based models are unable to process long documents due to their self-full attention mechanism, which scales quadratically with the sequence length, and thus most large-scale pre-trained models can only accept inputs much shorter than the average transcript length. To address this problem a transformer-based model with an attention mechanism that scales linearly with sequence length is used, making it possible to process documents with thousands of tokens or more. While BART-based pre-trained models typically have a 512 or 1024 token limit, Longformer can process up to 16K tokens.

FIG. 7 illustrates example multilingual summarizations according to three example use cases. As shown in FIG. 7, summarizations of an episode in English, Japanese and Klingon are being requested. A Venn diagram is used to show the relationships among the models and the way they are trained and used. A multilingual transformer model 702 has been pre-trained in multiple languages. An example multilingual transformer model 702 is mBART-50. mBart-50 is pre-trained to perform translations in 50 languages, but it is not necessarily finetuned to perform any particular task other than a translation task. The multilingual transformer model 702 can also be finetuned to perform a summarization task in a predetermined number (L, where L is an integer) of languages. In the example illustrated in FIG. 7, the multilingual transformer model 702 is finetuned to perform the summarization task in three languages, English (EN), Spanish (ES) and Portuguese (PT), as represented by finetuned multilingual transformer model 704.

In the case an episode summary in English is requested, because there exists a finetuned multilingual transformer model that has been finetuned to English for the summarization task, the finetuned multilingual transformer model 704 is applied to the query episode transcript. In the case when an episode summary in Japanese is requested, because there does not exist a finetuned multilingual transformer model that has been finetuned to Japanese for the summarization task, the finetuned multilingual transformer model 704 cannot be used. Instead, a multilingual transformer model 702 pre-trained in Japanese is used (unmodified).

In the case when an episode summary in Klingon is requested, because there does not exist a finetuned multilingual transformer model that has been finetuned for the summarization task on data in Klingon, the finetuned multilingual transformer model 704 cannot be used. Nor is an unmodified multilingual transformer model 702 that has been pre-trained in Klingon for the translation tasks available. In this use case, the episode transcript is tokenized and cropped.

The example embodiments described herein may be implemented using hardware, software or a combination thereof and may be implemented in one or more computer systems or other processing systems. However, the manipulations performed by these example embodiments were often referred to in terms, such as entering, which are commonly associated with mental operations performed by a human operator. No such capability of a human operator is necessary, in any of the operations described herein. Rather, the operations may be completely implemented with machine operations. Useful machines for performing the operation of the example embodiments presented herein include general purpose digital computers or similar devices.

From a hardware standpoint, a CPU typically includes one or more components, such as one or more microprocessors, for performing the arithmetic and/or logical operations required for program execution, and storage media, such as one or more memory cards (e.g., flash memory) for program and data storage, and a random access memory, for temporary data and program instruction storage. From a software standpoint, a CPU typically includes software resident on a storage media (e.g., a memory card), which, when executed, directs the CPU in performing transmission and reception functions. The CPU software may run on an operating system stored on the storage media, such as, for example, UNIX or Windows, iOS, Linux, and the like, and can adhere to various protocols such as the Ethernet, ATM, TCP/IP protocols and/or other connection or connectionless protocols. As is well known in the art, CPUs can run different operating systems, and can contain different types of software, each type devoted to a different function, such as handling and managing data/information from a particular source, or transforming data/information from one format into another format. It should thus be clear that the embodiments described herein are not to be construed as being limited for use with any particular type of server computer, and that any other suitable type of device for facilitating the exchange and storage of information may be employed instead.

A CPU may be a single CPU, or may include plural separate CPUs, wherein each is dedicated to a separate application, such as, for example, a data application, a voice application, and a video application. Software embodiments of the example embodiments presented herein may be provided as a computer program product, or software, that may include an article of manufacture on a machine accessible or non-transitory computer-readable medium (i.e., also referred to as "machine readable medium") having instructions. The instructions on the machine accessible or machine-readable medium may be used to program a computer system or other electronic device. The machine-readable medium may include, but is not limited to, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium", "machine readable medium" and "computer-readable medium" used herein shall include any non-transitory medium that is capable of storing, encoding, or transmitting a sequence of instructions for execution by the machine (e.g., a CPU or other type of processing device) and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

A graphic processing unit (GPU) is a hardware component that is typically used to enhance application and system performance, particularly when used in cooperation with a central processing unit (CPU). GPUs can also perform parallel processing with large blocks of data to deliver enormous computational capability in areas like machine learning. In some embodiments, one or more GPUs are programmed to train the models described herein.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. A system for generating multilingual abstractive summaries, comprising:
at least one processor configured to:
receive a plurality of preprocessed episode descriptions in a plurality of languages;
receive a plurality of episode transcripts, each episode transcript corresponding to at least one of the plurality of preprocessed episode descriptions;
convert a full attention mechanism of a multilingual transformer model into a Longformer attention mechanism, thereby generating a Longformer multilingual transformer model;
finetune the Longformer multilingual transformer model to perform a summarization task using preprocessed episode-description: episode-transcript pairs, thereby generating a finetuned Longformer multilingual transformer model;
receive a query episode transcript;
determine a language of the query episode transcript; and
when the finetuned Longformer multilingual transformer model is not finetuned to the language of the query episode transcript and a translation model pretrained on the language of the query episode transcript is available, generate a summary of the query episode transcript using the translation model pretrained on the language of the query episode transcript.

2. The system according to claim 1, wherein the at least one processor is further configured to:
when the finetuned Longformer multilingual transformer model is finetuned to the language of the query episode transcript, generate the summary of the query episode transcript using the finetuned Longformer multilingual transformer model.

3. The system according to claim 1, wherein the at least one processor is further configured to:
when the finetuned Longformer multilingual transformer model is not finetuned to the language of the query episode transcript and a translation model pretrained on the language of the query episode transcript is not available, tokenize a portion of the query episode transcript and select a predetermined number (T) of tokens to generate the summary of the query episode transcript, where T is an integer.

4. The system according to claim 1, wherein the multilingual transformer model is pre-trained for the task of translation on data in multiple languages.

5. The system according to claim 4, wherein the preprocessed episode-description:episode-transcript pairs are in multiple target languages.

6. The system according to claim 1, wherein the at least one processor is further configured to:
finetune the Longformer multilingual transformer model to perform a summarization task based on article-summary:full-original-article pairs prior to finetuning the Longformer multilingual transformer model to perform a summarization task based on the preprocessed episode-description:episode-transcript pairs; and
generate the summary of the query episode transcript using the finetuned Longformer multilingual transformer model.

7. The system according to claim 1, wherein the at least one processor is further configured to:
evaluate the finetuned Longformer multilingual transformer model to generate an evaluation metric; and
update the finetuned Longformer multilingual transformer model based on the evaluation metric.

8. The system according to claim 1, wherein the multilingual transformer model is an mBart-50 model or an mT5 (multilingual Text-To-Text Transformer) model.

9. The system according to claim 1, wherein the multilingual transformer model is finetuned to an XL-SUM dataset for the summarization task.

10. The system according to claim 1, wherein the at least one processor is further configured to:
receive a plurality of episode descriptions that are not preprocessed;
remove an episode transcript from the plurality of episode transcripts that has a corresponding episode descriptions outside a predetermined boundary condition; and
apply a term frequency-inverse document frequency (TF-IDF) vectorization operation to the plurality of episode descriptions to generate a similarity metric between at least a pair of episode descriptions and filter out one of the pair of episode descriptions if the similarity metric is within a predetermined threshold.

11. A method for generating multilingual abstractive summaries, comprising:
receiving a plurality of preprocessed episode descriptions in a plurality of languages;
receiving a plurality of episode transcripts, each episode transcript corresponding to at least one of the plurality of preprocessed episode descriptions;
converting a full attention mechanism of a multilingual transformer model into a Longformer attention mechanism, thereby generating a Longformer multilingual transformer model;
finetuning the Longformer multilingual transformer model to perform a summarization task based on preprocessed episode-description:episode-transcript pairs, thereby generating a finetuned Longformer multilingual transformer model;
receiving a query episode transcript;
determining a language of the query episode transcript; and
when the finetuned Longformer multilingual transformer model is not finetuned to the language of the query episode transcript and a translation model pretrained on the language of the query episode transcript is available, generating a summary of the query episode transcript using the translation model pretrained on the language of the query episode transcript.

12. The method according to claim 11, further comprising:
when the finetuned Longformer multilingual transformer model is finetuned to the language of the query episode transcript, generating the summary of the query episode transcript using the finetuned Longformer multilingual transformer model.

13. The method according to claim 11, further comprising:
when the finetuned Longformer multilingual transformer model is not finetuned to the language of the query episode transcript and a translation model pretrained on the language of the query episode transcript is not available, tokenizing a portion of the query episode transcript and selecting a predetermined number (T) of tokens to generate a summary of the query episode transcript, where T is an integer.

14. The method according to claim 11, wherein the multilingual transformer model is pre-trained on data in multiple languages.

15. The method according to claim 14, wherein the preprocessed episode-description:episode-transcript pairs are in multiple languages.

16. The method according to claim 11, further comprising:
finetuning the Longformer multilingual transformer model to perform a summarization task based on article-summary:full-original-article pairs prior to finetuning the Longformer multilingual transformer model to perform a summarization task based on the preprocessed episode-description:episode-transcript pairs; and
generating the summary of the query episode transcript using the finetuned Longformer multilingual transformer model.

17. The method according to claim 11, further comprising
evaluating the finetuned Longformer multilingual transformer model to generate an evaluation metric; and
updating the finetuned Longformer multilingual transformer model based on the evaluation metric.

18. The method according to claim 11, further comprising:
evaluating the finetuned Longformer multilingual transformer model to generate an evaluation metric; and
updating the finetuned Longformer multilingual transformer model based on the evaluation metric.

19. The method according to claim 11, wherein the multilingual transformer model is an mBart-50 model or an mT5 (multilingual Text-to-Text Transformer) model.

20. The method according to claim 11, wherein the multilingual transformer model is finetuned to an XL-SUM dataset for the summarization task.

21. The method according to claim 11, further comprising:
receiving a plurality of episode descriptions that are not preprocessed;
removing an episode transcript from the plurality of episode transcripts that has a corresponding episode descriptions outside a predetermined boundary condition; and
applying a term frequency-inverse document frequency (TF-IDF) vectorization operation to the plurality of episode descriptions to generate a similarity metric between at least a pair of episode descriptions and filter out one of the pair of episode descriptions if the similarity metric is within a predetermined threshold.

22. A non-transitory computer-readable medium having stored thereon one or more sequences of instructions for causing one or more processors to perform:
receiving a plurality of preprocessed episode descriptions;
receiving a plurality of episode transcripts, each episode transcript corresponding to at least one of the plurality of preprocessed episode descriptions;

converting a full attention mechanism of a multilingual transformer model into a Longformer attention mechanism, thereby generating a Longformer multilingual transformer model;

finetuning the Longformer multilingual transformer model to perform a summarization task using preprocessed episode-description:episode-transcript pairs, thereby generating a finetuned Longformer multilingual transformer model;

receiving a query episode transcript;

determining language of the query episode transcript; and when the finetuned Longformer multilingual transformer model is not finetuned to the language of the query episode transcript and a translation model pretrained on the language of the query episode transcript is available, generating a summary of the query episode transcript using a translation model pretrained on the language of the query episode transcript.

23. The non-transitory computer-readable medium of claim 22, further having stored thereon a sequence of instructions for causing the one or more processors to perform:

when the finetuned Longformer multilingual transformer model is finetuned to the language of the query episode transcript, generating the summary of the query episode transcript using the finetuned Longformer multilingual transformer model.

24. The non-transitory computer-readable medium of claim 22, further having stored thereon a sequence of instructions for causing the one or more processors to perform:

when the finetuned Longformer multilingual transformer model is not finetuned to the language of the query episode transcript and a translation model pretrained on the language of the query episode transcript is not available, tokenizing a portion of the query episode transcript and selecting a predetermined number (T) of tokens to generate a summary of the query episode transcript, where T is an integer.

25. The non-transitory computer-readable medium of claim 22, wherein the multilingual transformer model is pre-trained on data in multiple languages.

26. The non-transitory computer-readable medium of claim 25, wherein the preprocessed episode-description:episode-transcript pairs are in multiple languages.

27. The non-transitory computer-readable medium of claim 22, further having stored thereon a sequence of instructions for causing the one or more processors to perform:

finetuning the Longformer multilingual transformer model to perform a summarization task based on article-summary:full-original-article pairs prior to finetuning the Longformer multilingual transformer model to perform a summarization task based on the preprocessed episode-description:episode-transcript pairs; and generating the summary of the query episode transcript using the finetuned Longformer multilingual transformer model.

28. The non-transitory computer-readable medium of claim 22, further having stored thereon a sequence of instructions for causing the one or more processors to perform:

evaluating the finetuned Longformer multilingual transformer model to generate an evaluation metric; and updating the finetuned Longformer multilingual transformer model based on the evaluation metric.

* * * * *